US012689111B2

(12) United States Patent
Carrarini et al.

(10) Patent No.: US 12,689,111 B2
(45) Date of Patent: Jul. 21, 2026

(54) INFORMATION-EXCHANGING STREET POLE

(71) Applicant: ANAS—SOCIETA PER AZIONI, Rome (IT)

(72) Inventors: Luigi Carrarini, Rome (IT); Daniela De Nigris, Rome (IT)

(73) Assignee: ANAS—SOCIETA PER AZIONI, Rome (IT)

( * ) Notice: Subject to any disclaimer, the term of this patent is extended or adjusted under 35 U.S.C. 154(b) by 27 days.

(21) Appl. No.: 18/837,913

(22) PCT Filed: Feb. 13, 2023

(86) PCT No.: PCT/IB2023/051265
§ 371 (c)(1),
(2) Date: Aug. 13, 2024

(87) PCT Pub. No.: WO2023/152713
PCT Pub. Date: Aug. 17, 2023

(65) Prior Publication Data

US 2025/0149771 A1 May 8, 2025

(30) Foreign Application Priority Data

Feb. 14, 2022 (IT) ........................ 102022000002639

(51) Int. Cl.
*H01Q 1/12* (2006.01)
*H01Q 1/06* (2006.01)
*H01Q 1/22* (2006.01)

(52) U.S. Cl.
CPC ............. *H01Q 1/1242* (2013.01); *H01Q 1/06* (2013.01); *H01Q 1/2291* (2013.01)

(58) Field of Classification Search
CPC ....... H01Q 1/1242; H01Q 1/06; H01Q 1/2291
See application file for complete search history.

(56) References Cited

U.S. PATENT DOCUMENTS

| | | | | |
|---|---|---|---|---|
| 618,420 | A * | 1/1899 | Kinney et al. | G01L 23/02 346/5 |
| 2015/0349399 | A1* | 12/2015 | Lasier | H05B 47/19 248/542 |
| 2017/0279187 | A1* | 9/2017 | Lockwood | H01Q 1/42 |

(Continued)

OTHER PUBLICATIONS

Anonymous: "Fiberglass—Wikipedia, the free encyclopedia", Aug. 28, 2013, XP055210202, URL: http://web.archive.org/web/20130828090317/http://en.wikipedia.org/wiki/Fiberglass.

(Continued)

*Primary Examiner* — Dameon E Levi
*Assistant Examiner* — Jordan E. DeWitt
(74) *Attorney, Agent, or Firm* — Rivka Friedman

(57) ABSTRACT

An information-exchanging street pole (1) comprising: a protection module (100) extending in a main direction of extension (X), a first cavity (101) formed inside the protection module (102) and extending in the main direction of extension (X), a two-way antenna, configured to be in signal communication with external devices and to generate a signal within a frequency range. The information-exchanging street pole is characterized in that the protection module (100) is radio-transparent to the frequency range and the antenna is located in the first cavity (101) of the protection module (102).

8 Claims, 5 Drawing Sheets

(56) References Cited

U.S. PATENT DOCUMENTS

Figure 1:
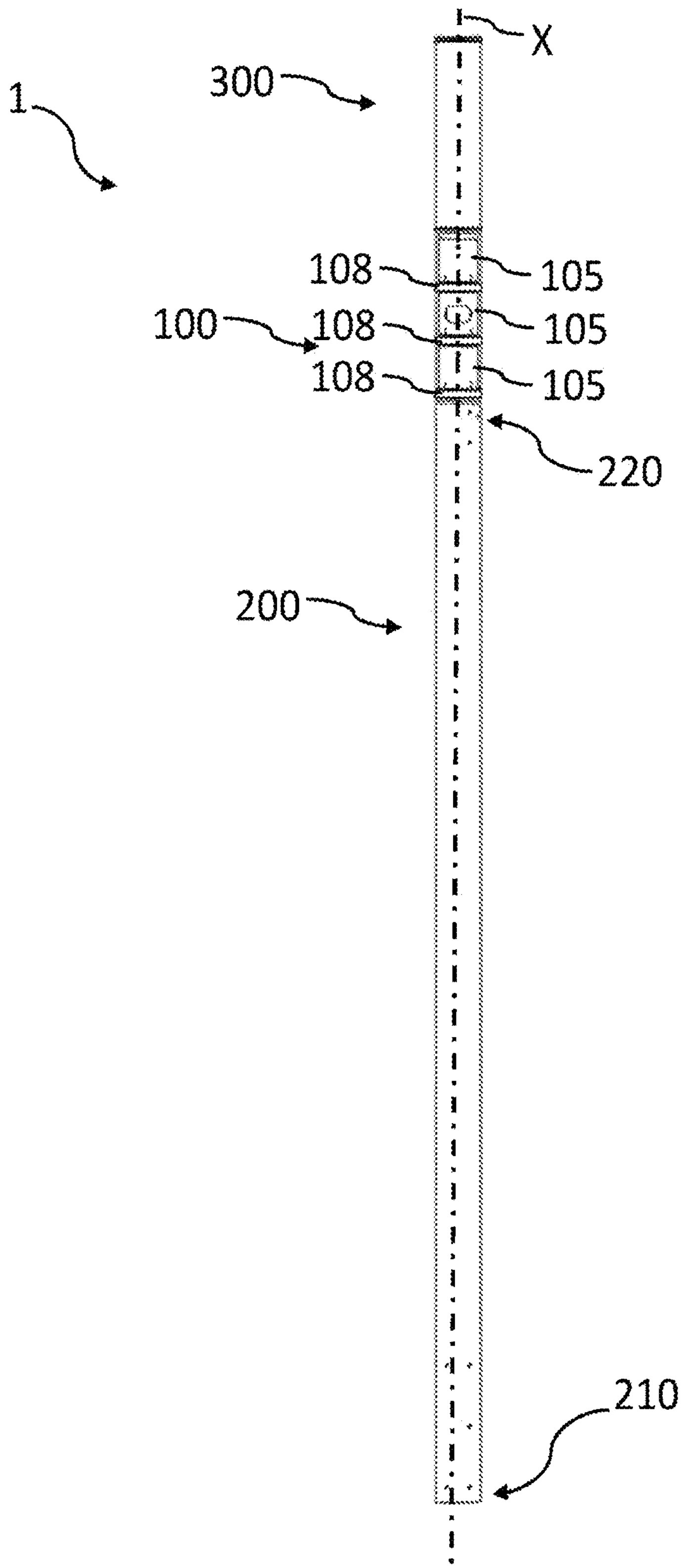

| | | | | |
|---|---|---|---|---|
| 2018/0219278 | A1* | 8/2018 | Wigdahl | H01Q 1/1242 |
| 2018/0351245 | A1* | 12/2018 | Constance | H01Q 1/245 |
| 2020/0229198 | A1* | 7/2020 | Kung | H04W 72/23 |
| 2021/0083372 | A1* | 3/2021 | Chase | H01Q 1/246 |
| 2021/0313665 | A1* | 10/2021 | Hoganson | H01Q 1/02 |
| 2022/0174881 | A1* | 6/2022 | Tompkin | A01G 7/045 |
| 2024/0141673 | A1* | 5/2024 | Kim | G09F 7/18 |
| 2025/0003562 | A1* | 1/2025 | Spiro | F21S 8/086 |
| 2025/0149771 | A1* | 5/2025 | Carrarini | H01Q 1/1242 |

OTHER PUBLICATIONS

Italian Search Report for It 202200002639 Mailed On Sep. 26, 2022.

International Search Report for PCT/IB2023/051265 Mailed On May 16, 2023.

* cited by examiner

INFORMATION-EXCHANGING STREET POLE

The present invention relates to an information-exchanging street pole. The device is usefully employed in the field of mobility, especially proximate to roads and highways.

Lamp posts featuring modular assemblies configured to be in communication with external devices are known in the state of the art.

EP3685158A1 describes a lamp post provided with a module for checking the air quality. Specifically, the lamp post comprises a plurality of modules, among which: lighting modules, a module provided with a loudspeaker and a module provided with a camera. Moreover, the lamp post comprises further a signaling module. The modules are supported by a support pole, which comprises a removable door providing access to the inner part of the support pole. Furthermore, it comprises an antenna, configured for receiving and emitting cellular data.

EP3770488A1 shows a lamp post comprising a support pole with a sensor for monitoring a surrounding sensing area, and a communication device, configured to communicate wirelessly with vehicles proximate to the sensing area. Furthermore, the lamp post is in signal communication with a controller, which turns on the lamp post in order to send a visual warning signal.

Disadvantageously, the antenna of the lamp post according to EP3685158A1 is exposed to the external environment. Therefore, it could require a higher number of maintenance operations or more frequent replacements due to damages caused by the surrounding environment.

Disadvantageously, the lamp post according to EP3770488A1 is limited to communication with a vehicle in the vicinity of the surrounding sensing area, and it does not record data related to monitoring and output signals.

SUMMARY OF THE INVENTION

In this context, the technical task underlying the present invention is to propose an information-exchanging street pole overcoming the above-mentioned drawbacks of the known art.

Specifically, it is an object of the present invention to make available an information-exchanging street pole allowing motor vehicle users and other remote external devices to send and receive information using a transceiver which is protected from the external environment.

The defined technical task and the specified objects are substantially achieved by an information-exchanging street pole comprising the technical features set forth in one or more of the accompanying claims.

Specifically, an information-exchanging street pole comprises a protection module extending in a main direction of extension, a first cavity formed inside the protection module and extending in the main direction of extension.

The information-exchanging street pole comprises a two-way antenna configured to be in signal communication with external devices and to generate a signal within a frequency range.

The protection module of the information-exchanging street pole is radio-transparent to the frequency range and the antenna is located in the first cavity of the protection module.

Such an information-exchanging street pole solves the technical problem as the antenna is protected by a radio-transparent housing protecting the antenna from the external environment, without hindering the signal thereof.

Furthermore, the information-exchanging street pole is in signal communication with even remote external devices, in order to analyze and store the collected data.

LIST OF ILLUSTRATIONS

Figure 2:
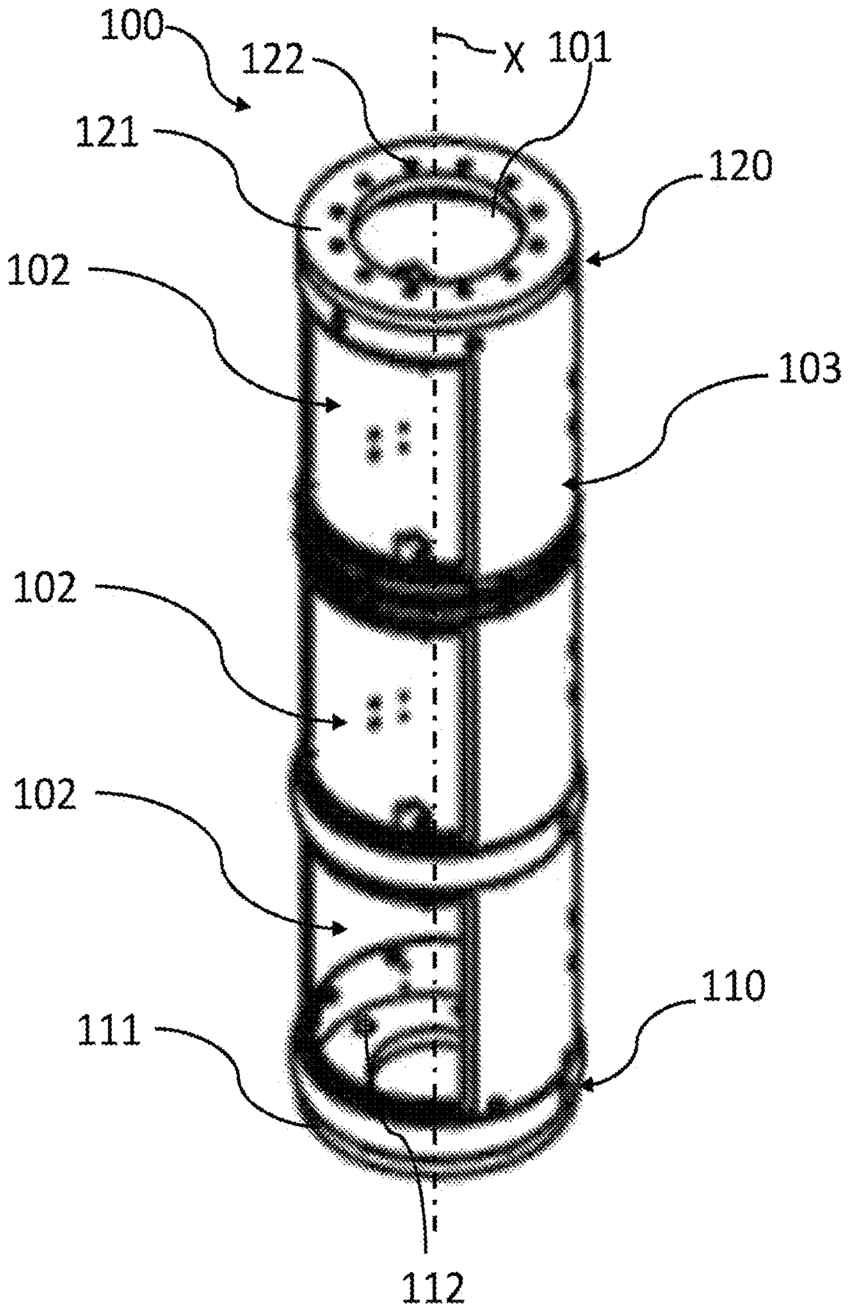
Figure 3:
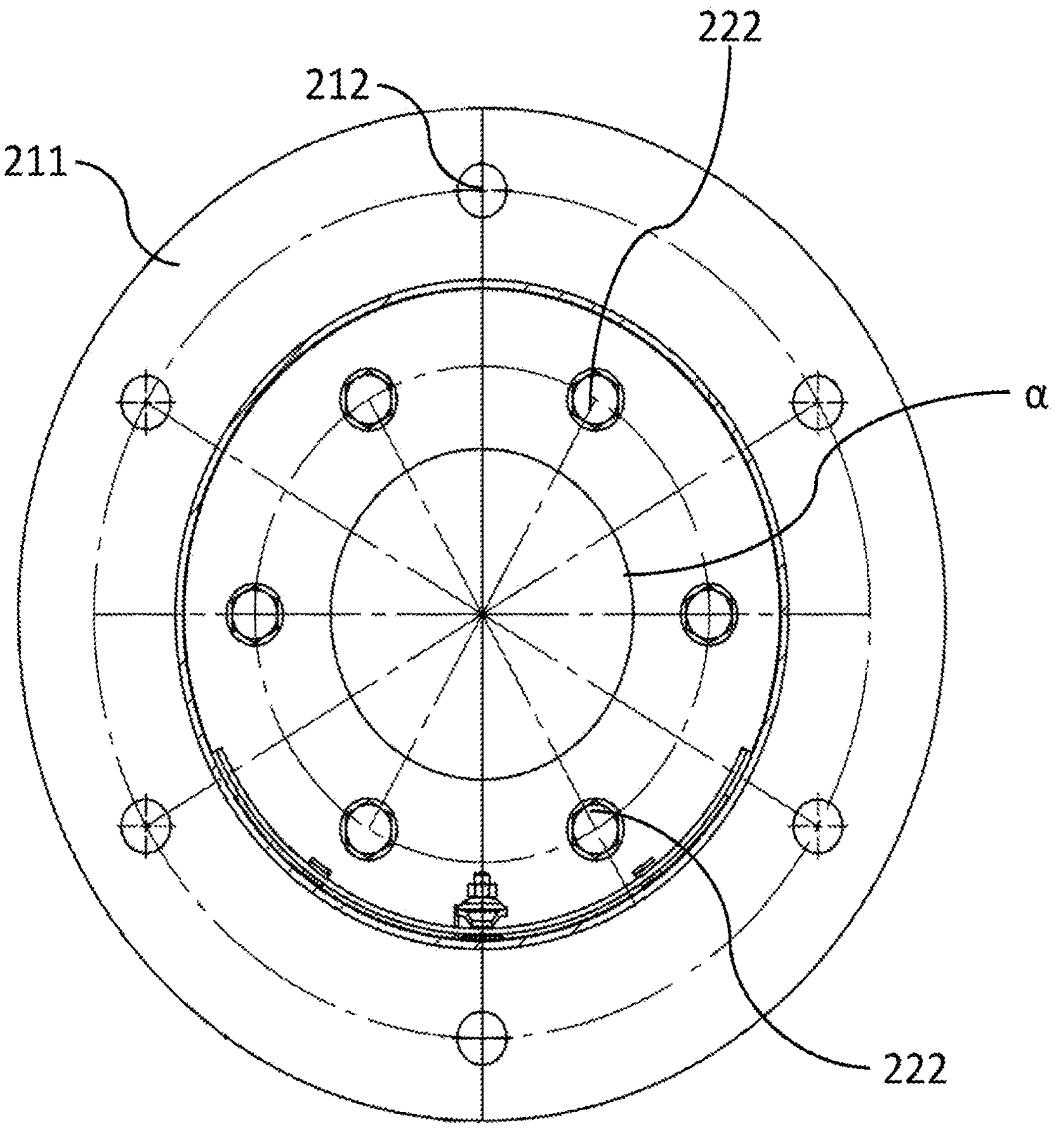
Figure 4:
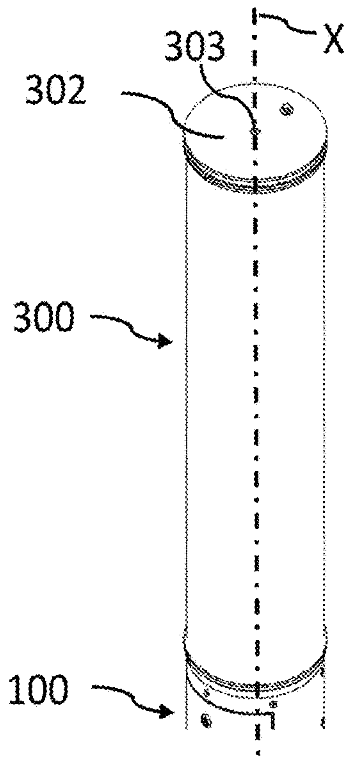
Figure 5:
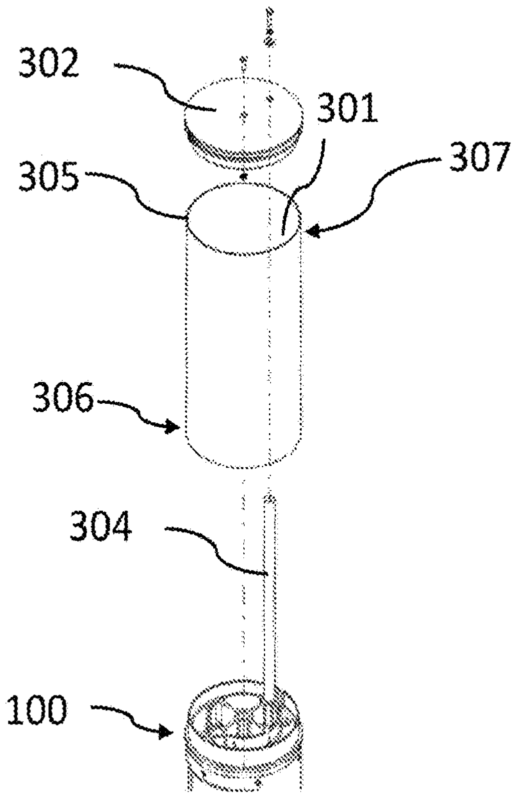
Figure 6:
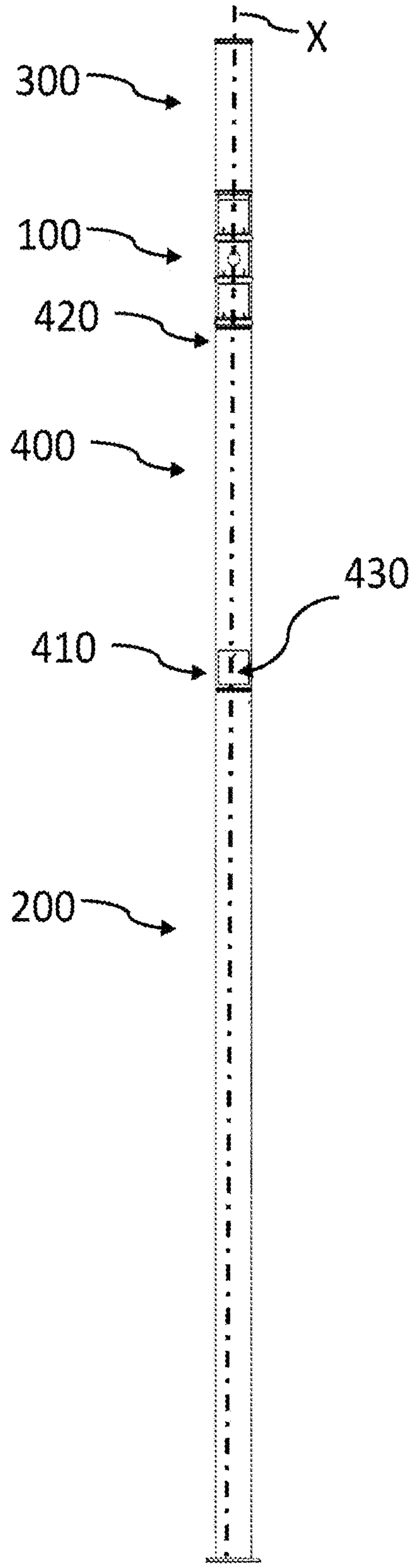

Other features and advantages of the present invention will become more apparent from the explanatory, thus not limiting description of a preferred, but not exclusive, embodiment of an information-exchanging street pole, as illustrated in the following Figures:

FIG. 1 shows a front orthogonal view of an information-exchanging street pole according to the present invention;

FIG. 2 shows a perspective view of a protection module of the information-exchanging street pole, FIG. 3 shows a top orthogonal view of a section of a support module of the information-exchanging street pole, FIG. 4 shows a perspective view of a top module of the information-exchanging street pole, FIG. 5 shows an exploded perspective view of the top module of the information-exchanging street pole, FIG. 6 shows a front orthogonal view of an alternative embodiment of the information-exchanging street pole.

DETAILED DESCRIPTION

With reference to the attached Figures, the reference number 1 indicates an information-exchanging street pole 1 according to the present invention.

The information-exchanging street pole 1 comprises a protection module 100, shown in FIG. 2, extending in a main direction of extension X. The protection module 100 comprises therein a first cavity 101 extending in the main direction of extension X. The protection module 100 is formed from a composite material. Specifically, the protection module 100 is formed from a composite of polyester and fiberglass.

In more detail, the protection module 100 comprises an opening 102 providing access to the first cavity 101 of the protection module 100. The opening 102 is located on a side surface 103 of the protection module 100. In a preferred embodiment, there are three openings 102 and are placed in the main direction of extension X. Each access opening 102 is closeable by a respective door 105 having a lock, as shown in FIG. 1. Preferably, each door 105 is formed from thermoformed polycarbonate.

As shown in FIG. 1, the protection module 100 comprises, on the side surface 103, a recess 108 with a circular shape and placed so that the main direction of extension X passes through the center thereof. There are preferably three recesses. The recess 108 is configured to accommodate a light ring. In a preferred embodiment, the light ring is a LED ring and, even more preferably, each LED ring comprises a RGB LED stripe and two lenses molded from opal polycarbonate.

It should be noted that the protection module 100 comprises a first lower end 110 and a first upper end 120, as shown in FIG. 2. At the first lower end 110, the protection module 100 comprises a first lower connection ring 111. Preferably, the first lower connection ring 111 is formed from steel. At the first upper end 120, the protection module 100 comprises a first upper connection ring 121. Preferably, the first upper connection ring 121 is formed from Kestamid. Both the first lower connection ring 111 and the first upper connection ring 121 comprise first 112 and second holes 122, respectively, configured to receive first and second connection means, in order to connect the protection module 100 to further modules. Specifically, the first lower connection ring 111 is configured to receive M16 screws and the first upper connection ring 121 is configured to receive M16 screws.

The information-exchanging street pole 1 comprises a support module 200, shown in FIG. 1, extending in the main direction of extension X.

Preferably, the support module 200 is formed from a composite material, preferably polyester and fiberglass. The support module 200 comprises a second cavity extending in the main direction of extension X. Specifically, the support module 200 is connected to the protection module 100, with the first 101 and second cavities aligned in the main direction of extension X.

In more detail, the support module 200 comprises a second lower end 210. It's worth to notice that in the second cavity, at the second lower end 210, the support module 200 comprises a steel core, fixed with screws, configured to strengthen the information-exchanging street pole 1.

The support module 200 further comprises a fixing ring 211, located at the second lower end 210 outside the support module 200. The fixing ring 211 comprises third holes 212, which are angularly equally spaced and configured to receive second connection means, in order to arrange and fix the information-exchanging street pole 1 proximate to a road.

The support module 200 comprises a second upper end 220, shown in FIG. 1, and a second upper connection ring, preferably formed from steel. Furthermore, the second upper connection ring is inserted in the second cavity of the support module 200 by means of screws at the second upper end 220. As shown in FIG. 3, the second upper connection ring comprises fourth holes 222, which are angularly equally spaced. Furthermore, the third 212 and fourth holes 222 are located so that, when observed in a sectional view as in FIG. 3, between each of the third holes 212 and the nearest fourth hole 222 an angle $\alpha$ is formed, preferably of 30°. It should be noted that the fourth holes 222 are configured to receive a first connection means, in order to connect the support module 200 to the protection module 100. The first connection means is further couplable, preferably with M16 bolts, in order to fix the support module 200 and the protection module 100.

The information-exchanging street pole 1 comprises a top module 300, shown in FIG. 4, extending in the main direction of extension X. The top module 300 comprises a third cavity 301 extending in the main direction of extension X. The top module 300 is connected to the protection module 100 so that the first 101 and third cavities 301 are aligned in the main direction of extension X. The top module 300 is preferably formed from polycarbonate.

It should be noted that the top module 300 comprises a third lower end 306 and a second lower connection ring. The second lower connection ring is preferably formed from polyurethane. Furthermore, the second lower connection ring comprises fifth holes configured to receive a second connection means, in order to connect the top module 300 to the protection module 100. Furthermore, the second connection means is couplable, preferably with M12 bolts, in order to fix the top module 300 and the protection module 100.

In more detail, the top module comprises a third upper end 307, which comprises an opening 305, as shown in FIG. 5, and a cover 302, placed to cover the opening 305. The cover 302 is preferably formed from polyurethane. The cover 302 comprises at least a hole 303 to ensure the dissipation of heat which may generate inside the information-exchanging street pole 1.

Finally, the top module 300 comprises a support rod 304 disposed in the third cavity 305, fixed to the cover 302 and to the second lower connection ring and configured to support the cover 302. The support rod 304 is preferably formed from aluminium.

According to a further embodiment, the information-exchanging street pole 1 comprises an intermediate module 400, as shown in FIG. 6. The intermediate module 400 comprises a fourth cavity extending in the main direction of extension X. The intermediate module 400 is located between the protection module 100 and the support module 200, with the first 101, second and fourth cavities aligned in the main direction of extension X. Furthermore, the support module 200 and the intermediate module 400 are preferably formed from steel.

The intermediate module 400 comprises a fourth lower end 410 and a fourth lower connection ring at the fourth lower end 410. The intermediate module 400 comprises further a fourth upper end 420 and a fourth upper connection ring at the fourth upper end 420.

Both the fourth lower and upper rings comprise respective holes configured to receive a further connection means, preferably screws, for connecting the extension module 400 to the support module 200 and the protection module 100, respectively.

The further connection means is further couplable, preferably with M16 bolts, in order to fix the intermediate module 400 to the support module 200 and the protection module 100, respectively.

Additionally, the extension module 400 comprises an opening and a door 430, configured to reversibly close such an opening and having a lock. Such an opening provides access to the fourth cavity of the extension module 400.

In more detail, the protection module 100 comprises a two-way antenna, not shown in the Figures, configured to be in signal communication with external devices and to generate a signal within a frequency range. It's worth to notice that the protection module 100 is radio-transparent to the frequency range and the antenna is located in the first cavity 101 of the protection module 100.

Specifically, the external devices comprise transceivers and are mobile and fixed external devices, for example. The antenna of the information-exchanging street pole 1 is configured to be in signal communication with the transceivers of the external devices.

The mobile external devices are smartphones and vehicles, for example. Furthermore, the mobile external devices pass proximate to the information-exchanging street pole, preferably within a range of a range in meters. The antenna is in signal communication with the mobile external devices through WiFi in motion, C-V2X and ITS-G5 signals. Specifically, the antenna is in signal communication with smartphones through WiFi in motion and with vehicles through C-V2X e ITS-G5 signals. The information-exchanging street pole comprises a conversion unit, capable of converting C-V2X signals into ITS-G5 signals, and vice versa, so as to put in communication vehicles using different signals.

The fixed external devices are data collection structures, for example, containing servers for data analysis and a control room. The fixed external devices are preferably located further away than the mobile external devices, such as within a range of a range in meters. The fixed external devices are configured to send signals to the antenna of the information-exchanging street pole 1.

In a preferred embodiment, the information-exchanging street pole 1 comprises a camera, not shown in the Figures, located in the protection module 100. The camera is configured to monitor an area close to the information-exchanging street pole 1. Specifically, the camera monitors, for example, the weather conditions, the traffic, and the presence of vehicles on the road. The images detected by the camera are sent to the fixed external device for recording and processing the same. After processing the images, the fixed external device sends a signal to the information-exchanging street pole 1, in order to change the light ring colors, for example.

The invention claimed is:

1. An information-exchanging street pole comprising:

a protection module extending in a main direction of extension, a first cavity formed inside the protection module and extending in the main direction of extension, the protection module being configured to house in the first cavity a two-way antenna configured to generate a signal within a frequency range, wherein the protection module is radio-transparent to the frequency range, wherein the information-exchanging street pole comprises a top module extending in the main direction of extension, the top module comprising a third cavity extending in the main direction of extension, the top module being connected to the protection module with the first and third cavities aligned in the main direction of extension, wherein the top module comprises a third upper end delimiting an opening and a cover placed to cover the opening, the cover delimits at least a hole to ensure the dissipation of heat generated inside the information-exchanging street pole, wherein the top module comprises a support rod disposed in the second cavity, fixed to the cover and to the second lower connection ring and configured to support the cover.

2. The information-exchanging street pole as claimed in claim 1, wherein the protection module is formed from a composite material.

3. The information-exchanging street pole as claimed in claim 2, wherein the composite material is a composite of polyester and fiberglass.

4. The information-exchanging street pole as claimed in claim 1, which comprises a support module extending in the main direction of extension; the support module comprising a second cavity extending in the main direction of extension; the support module being connected to the protection module with the first and second cavities aligned in the main direction of extension.

5. The information-exchanging street pole as claimed in claim 1, wherein the antenna is in signal communication with transceivers of external devices proximate the information-exchanging street pole.

6. The information-exchanging street pole as claimed in claim 1, wherein the antenna is in signal communication with transceivers of external devices, remote from the information-exchanging street pole.

7. The information-exchanging street pole as claimed in claim 1, wherein the protection module comprises at least one recess, each recess being configured to be a ring recess.

8. The information-exchanging street pole as claimed in claim 1, wherein the antenna is configured to be in signal communication with external devices, using at least one type of signal.

* * * * *